United States Patent
Chauhan et al.

(10) Patent No.: US 9,208,324 B2
(45) Date of Patent: Dec. 8, 2015

(54) SYSTEM AND METHOD TO PERFORM SECURE WEB APPLICATION TESTING BASED ON A HYBRID PIPELINED APPROACH

(71) Applicant: iViZ Techno Solutions Private Limited, Bangalore (IN)

(72) Inventors: Jitendra Chauhan, Gwalior (IN); Nilanjan De, Kolkata (IN); Bikash Barai, Kolkata (IN)

( * ) Notice: Subject to any disclaimer, the term of this patent is extended or adjusted under 35 U.S.C. 154(b) by 0 days.

(21) Appl. No.: 14/488,232

(22) Filed: Sep. 16, 2014

(65) Prior Publication Data

US 2015/0082442 A1 Mar. 19, 2015

(30) Foreign Application Priority Data

Sep. 17, 2013 (IN) .............................. 4170/CHE/2013

(51) Int. Cl.
| | |
|---|---|
| *G06F 11/00* | (2006.01) |
| *G06F 21/57* | (2013.01) |
| *H04L 29/06* | (2006.01) |
| *G06F 12/14* | (2006.01) |
| *G06F 12/16* | (2006.01) |

(52) U.S. Cl.
CPC .......... *G06F 21/577* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 6,098,091 | A * | 8/2000 | Kisor ..................... | G06F 9/5072 709/202 |
| 7,841,007 | B2 * | 11/2010 | Currie .................... | G06F 21/577 726/25 |
| 2005/0071649 | A1 * | 3/2005 | Shipp ..................... | G06F 21/563 713/188 |
| 2008/0244605 | A1 * | 10/2008 | Bennington ........... | G06Q 10/06 705/7.14 |
| 2008/0295172 | A1 * | 11/2008 | Bohacek ............. | H04L 63/1416 726/23 |
| 2010/0094899 | A1 * | 4/2010 | Yiu ....................... | G06F 9/5044 707/770 |
| 2010/0332281 | A1 * | 12/2010 | Horvitz ............ | G06Q 10/06311 705/7.13 |
| 2014/0237606 | A1 * | 8/2014 | Futoransky ........... | G06F 21/577 726/25 |

* cited by examiner

*Primary Examiner* — Dede Zecher
*Assistant Examiner* — Trang Doan
(74) *Attorney, Agent, or Firm* — The Law Office of Austin Bonderer, PC

(57) ABSTRACT

A processor implemented method of performing a security web application testing based on a hybrid pipelined application which includes (a) receiving, a scan profile selected from a group includes (i) an uniform resource locator associated with an application, (ii) one or more scan attack templates, (iii) one or more attack rules, and (iv) one or more automation scan results, (b) generating, a one or more possible tasks based on the scan profile, (c) selecting, at least a sub-set of tasks from the one or more possible tasks, (d) assigning, the sub-set of tasks to an automated task performing tool, and a user for execution, (e) obtaining, one or more tasks results associated with the sub-set of tasks executed by the automated task performing tool, and the user, and (f) updating, a database based on the one or more tasks results.

20 Claims, 14 Drawing Sheets

| IDENTIFIER | VULNERABILITY | MODULES |
|---|---|---|
| 21184 | POSSIBILITY OF PRICE MANIPULATION DURING ORDER PLACEMENT | UTEST---1596603500 |
| 21185 | POSSIBILITY OF MANIPULATING THE SHIPPING ADDRESS AFTER ORDER PLACEMENT | UTEST---1596603500 |
| 21186 | ABSENCE OF MOBILE VERIFICATION FOR CASH- DELIVERY ORDERS | UTEST---1596603500 |
| 21187 | OBTAINING CASH BACK/ REFUNDS AFTER ORDER CANCELLATION | UTEST---1596603500 |
| 21188 | NON DEDUCTION OF DISCOUNTS OFFERED EVEN AFTER ORDER CANCELLATION | UTEST---1596603500 |
| 21189 | CHECK IF COUPON IS REUSABLE OR NOT | UTEST---1596603500 |

FIG. 9A

| IDENTIFIER | VERIFIED? | VULNERABILITY (901B) | UNIFORM RESOURCE LOCATOR (URL) (902B) | SEVERITY (903B) |
|---|---|---|---|---|
| 427 | ☐ | WINDOWS HARD LINK | HTTP://WWW.WEBSCANTEST.COM/APL/DUMMYTARGET2/MOVIL.INDEX_ES.HTML | LOW |
| 428 | ☐ | INFORMATION LEAK THROUGH COMMENTS | HTTP://WWW.WEBSCANTEST.COM/GENERAL/MAPAWEB_CA.HTML | INFO |
| 429 | ☐ | VIRTUAL FILE PROBLEMS | HTTP://WWW.WEBSCANTEST.COM/DEPLOYEDFILES/DUMMYTARGET2/ESTATICOS.HTML | INFO |
| 430 | ☐ | TAMPERING OF DATA COMMUNICATION BETWEEN PAYMENT GATEWAY | HTTP://WWW.WEBSCANTEST.COM/GENERAL/MAPAWEB_CA.HTML | LOW |

FIG. 9B

| IDENTIFIER | TITLE 901C | STATUS 902C | STAGE |
|---|---|---|---|
| 28601 | CHECK IF TARGET IS ACCESSIBLE OVER INTERNET | IN PROGRESS | ... |
| 28602 | CHECK IF TARGET IS ACCESSIBLE OVER VPN | IN PROGRESS | ... |
| 28603 | CHECK IF THE USER CREDENTIALS ARE PROVIDED ALONG WITH THE ROLES | IN PROGRESS | ... |
| 28604 | VERIFY THE SCAN TYPE IS PROVIDED | IN PROGRESS | ... |
| 28605 | VERIFY THE ENVIRONMENT TYPE IS PROVIDED | NEW | ... |
| 28606 | VERIFY THAT UNSAFE TEST OPTION IS PROVIDED | NEW | ... |

FIG. 9C

SYSTEM AND METHOD TO PERFORM SECURE WEB APPLICATION TESTING BASED ON A HYBRID PIPELINED APPROACH

CROSS-REFERENCE TO RELATED APPLICATIONS

This application claims priority to Indian patent application no. 4170/CHE/2013 filed on Sep. 17, 2013, the complete disclosure of which, in its entirely, is herein incorporated by reference.

BACKGROUND

1. Technical Field

The embodiments herein relate to a system and method for scanning of web applications, and more particularly, a system and method to perform a web application security testing based on a hybrid pipeline approach.

2. Description of the Related Art

Web application security testing is primarily performed by signature based automated scanners and human security testers (commonly referred as security consultants). Automated scanners produce a lot of False Positives in terms of detecting security bugs or vulnerabilities. Moreover, automated scanners are also not capable to detect logical security bugs or vulnerabilities. On the other hand, Human Security Testers have less of False Positives and are capable to detect logical security vulnerabilities. However, Human Security Testers are costly and less scalable. Human Security Testers are also less consistent primarily because it is the human testers who choose the test cases and not that the test cases choose the testers.

The automated application security scanners utilize signature-based database to inject faults in an application and match the responses with the signatures to detect vulnerabilities or security flaws in the application. Semi-automated security testing is carried out by penetration testers using various automated scanners and tools, automated scanners perform scanning and penetration testers apply human intelligence and experience to detect more advance vulnerabilities. However, there are still some fundamental challenges in the web application security field that need to be resolved.

One of the challenges in web application security is vulnerability verification to remove false positives and to perform actual exploitation. The automated tools and scanners detect vulnerabilities in the web application based on their signature database. However, vulnerabilities reported by automated scanners generally have false positives. A false positive means that a feature of the web application, which is not security vulnerability, gets classified as vulnerability. Further, vulnerabilities reported by automated scanners generally require further analysis such as how to exploit the vulnerability to find the actual security impact of vulnerability in the context of customer network.

Second challenge in the web application security is that there are certain classes of vulnerabilities in web applications that require logical understanding of the web applications for detecting such vulnerabilities. Some of the examples of such vulnerabilities are business logic vulnerabilities, data validation vulnerabilities, authorization related vulnerabilities and many others. In order to find such vulnerabilities, human security testers need to understand the architecture, implementation technology, security mechanisms, use cases and data flow of the web application. As a result, human security testers need to continuously engage as part of application scanning to detect such classes of logical vulnerabilities.

Scaling a high quality security testing to thousands and millions of web applications is another fundamental challenge of security industry today. Automated scanning is scalable by including additional computational power. However, automated scanning generates a lot of false positives and lacks logical vulnerability testing capability. On the other hand, semi-automated security testing approach is not scalable because of various reasons including the fact that human security testers are costlier and time intensive to train. Consistency of quality security results is another concern where semi-automated security testing approach depends substantially on the expertise of the human security testers. Same web application scanned by two different human security testers may produce different results. The primary reason for this is because human security testers choose the test cases and not the other way round. As a result, two different testers may choose or think different test cases for the same web application.

Accordingly, there remains a need for an efficient method for security scanning of web applications to achieve better quality measured in terms of less false positives, detection of logical vulnerabilities and test classes coverage, consistency of results, and at the same time reduces cost to perform penetration testing.

SUMMARY

In view of the foregoing, an embodiment herein provides a processor implemented method of performing a security web application testing based on a hybrid pipelined application is provided. The processor implemented method includes (a) receiving, a scan profile selected from a group includes (i) an uniform resource locator associated with an application, (ii) one or more scan attack templates, (iii) one or more attack rules, and (iv) one or more automation scan results, (b) generating, a one or more possible tasks based on the scan profile, (c) selecting, at least a sub-set of tasks from the one or more possible tasks based on one or more parameters selected from a group include (i) task goals, and (ii) one or more use cases, (d) assigning, the sub-set of tasks to an automated task performing tool, and a user for execution based on an availability the user and the automated task performing tool, a complexity of a task, a level of skill of the user, time to finish constraints, and the cost and reward values, (e) obtaining, one or more tasks results associated with the sub-set of tasks executed by the automated task performing tool, and the user, and (f) updating, a database based on the one or more tasks results. The one or more possible tasks include (i) dependencies between the one or more possible tasks, and (ii) a cost and a reward values for performing the one or more possible tasks.

The processor implemented method may further include one or more steps associated with an execution of the sub-set of tasks by the user are recorded. The processor implemented method may further include a correlation of one or more tasks results are performed with the one or more scan attack templates to generate a subsequent set of tasks. The processor implemented method may further include the subsequent set of tasks is assigned to the user based on the one or more steps. The one or more possible tasks may be generated based on one or more models (i) attack rules, and (ii) a hybrid task graph (HTG). The hybrid task graph may be updated based on the one or more tasks results. The updated hybrid task graph may include (i) pruning of a sub-graph of the hybrid task graph, (ii) adding new task nodes, (iii) re-computing the one or more factors for each task node, or (iv) combinations thereof. The processor implemented method may further include (i) a subsequent set of tasks results associated with the subsequent set of tasks from the automated task performing tool, and the user is obtained, and (ii) an updated hybrid task graph may be generated based on the subsequent set of tasks results. The updated hybrid task graph include (i) pruning of a sub-graph of the hybrid task graph, (ii) adding new task nodes, (iii) re-computing the one or more factors for each task node, or (iv) combinations thereof.

In another aspect, a computer implemented system to perform a security web application testing based on a hybrid pipelined application is provided. The computer implemented system includes (i) a memory unit that stores (a) a set of modules, (b) a database, and instructions, and (c) a knowledge base, and (ii) a processor when configured by the instructions executes the set of modules. The set of modules includes (a) a scan profile obtaining module, executed by the processor, that obtains a scan profile as an input, (b) an analysis engine, executed by the processor, further include (i) an task generation module, executed by the processor, generates a one or more possible tasks based on the scan profile, (ii) a task selection module, executed by the processor, that selects at least a sub-set of tasks from the one or more possible tasks based on one or more parameters selected from a group includes (i) task goals, and (ii) one or more use cases, (c) a task assignment module, executed by the processor, that assigns the sub-set of tasks to an automated task performing tool, and a user for execution based on an availability the user and the automated task performing tool, a complexity of a task, a level of skill of the user, time to finish constraints, and the cost and reward values, and (d) a tasks results obtaining module, executed by the processor, that (i) obtains one or more tasks results associated with the sub-set of tasks executed by the automated task performing tool, and the user, and (ii) update a database based on the one or more tasks results.

The database includes (i) information associated with a scan profile, and (ii) one or more tasks results. The knowledge base includes knowledge in form of (i) scan workflow templates, and (ii) one or more rules. The knowledge base further includes sequential information of one or more steps taken during a first scan of the web application. The scan profile include (i) an uniform resource locator associated with an application, (ii) one or more scan attack templates, (iii) one or more attack rules, and (iv) one or more automation scan results. The one or more possible tasks include (i) dependencies between the one or more possible tasks, and (ii) a cost and a reward values for performing the one or more possible tasks.

The computer implemented system may further include a task recording module, executed by the processor that records one or more steps associated with an execution of the sub-set of tasks by the user. The computer implemented system may further include a correlation of one or more tasks results are performed with the one or more scan attack templates to generate a subsequent set of tasks. The computer implemented system may further include the subsequent set of tasks may be assigned to the user based on the one or more steps. The one or more possible tasks may be generated based on one or more models (i) attack rules, and (ii) a hybrid task graph (HTG). The hybrid task graph may be updated based on the one or more tasks results. The updated hybrid task graph may include (i) pruning of a sub-graph of the hybrid task graph, (ii) adding new task nodes, (iii) re-computing the one or more factors for each task node, or (iv) combinations thereof. The computer implemented system may further include (i) obtains a subsequent set of tasks results associated with the subsequent set of tasks from the automated task performing tool, and the user, and (ii) generates an updated hybrid task graph based on the subsequent set of tasks results. The updated hybrid task graph may include (i) pruning of a sub-graph of the hybrid task graph, (ii) adding new task nodes, (iii) re-computing the one or more factors for each task node, or (iv) combinations thereof.

In yet another aspect, one or more non-transitory computer readable storage mediums storing one or more sequences of instructions are provided. The one or more processors are when executed causes (a) receiving, a scan profile selected from a group include (i) an uniform resource locator associated with an application, (ii) one or more scan attack templates, (iii) one or more attack rules, and (iv) one or more automation scan results, (b) generating a one or more possible tasks based on the scan profile, (c) selecting at least a sub-set of tasks from the one or more possible tasks based on one or more parameters selected from a group include (i) task goals, and (ii) one or more use cases, (d) assigning the sub-set of tasks to an automated task performing tool, and a user for execution based on an availability the user and the automated task performing tool, a complexity of a task, a level of skill of the user, time to finish constraints, and the cost and reward values, (e) obtaining one or more tasks results associated with the sub-set of tasks executed by the automated task performing tool, and the user, and (f) updating a database based on the one or more tasks results. The one or more possible tasks include (i) dependencies between the one or more possible tasks, and (ii) a cost and a reward values for performing the one or more possible tasks.

The one or more non-transitory computer readable storage mediums may further include one or more steps associated with an execution of the sub-set of tasks by the user is recorded. The one or more non-transitory computer readable storage mediums may further include a correlation of one or more tasks results is performed with the one or more scan attack templates to generate a subsequent set of tasks. The one or more non-transitory computer readable storage mediums may further includes the subsequent set of tasks is assigned to the user based on the one or more steps. The one or more possible tasks may be generated based on one or more models (i) attack rules, and (ii) a hybrid task graph (HTG).

The hybrid task graph may be updated based on the one or more tasks results. The updated hybrid task graph may include (i) pruning of a sub-graph of the hybrid task graph, (ii) adding new task nodes, (iii) re-computing the one or more factors for each task node, or (iv) combinations thereof. The one or more non-transitory computer readable storage mediums may further include (i) a subsequent set of tasks results associated with the subsequent set of tasks from the automated task performing tool, and the user is obtained, and (ii) generating an updated hybrid task graph based on the subsequent set of tasks results. The updated hybrid task graph may include (i) pruning of a sub-graph of the hybrid task graph, (ii) adding new task nodes, (iii) re-computing the one or more factors for each task node, or (iv) combinations thereof.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 9A, 9B and 9C is a user interface view illustrating method of performing a security web application testing based on a hybrid pipelined application according to an embodiment herein;

DETAILED DESCRIPTION OF PREFERRED EMBODIMENTS

Figure 1:
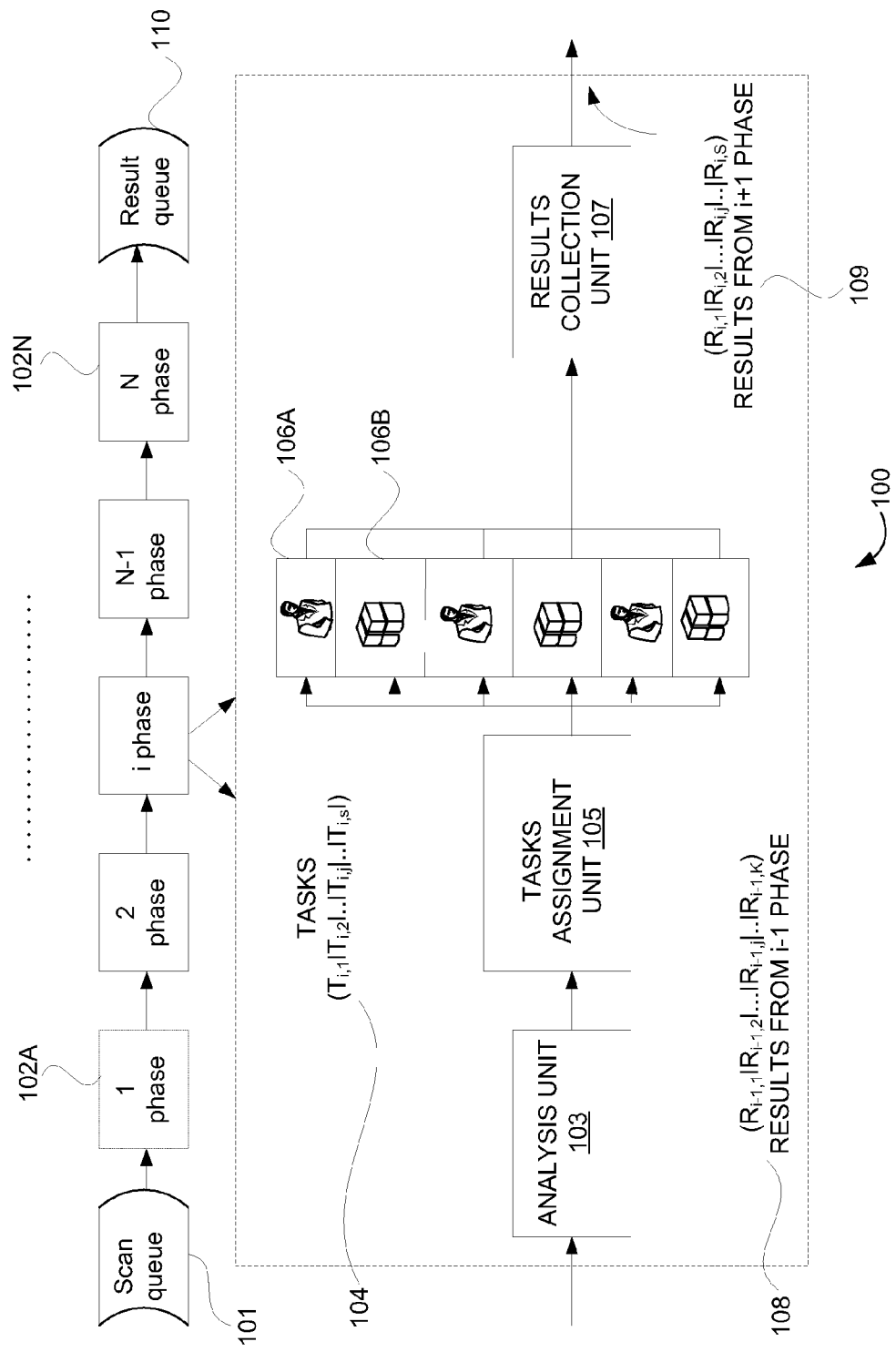
FIG. 1 is a block diagram illustrates a hybrid pipeline based application scanning system to perform security scanning of a web application according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an efficient method for security scanning of web applications to achieve better quality measured in terms of less false positives, detection of logical vulnerabilities and test classes coverage, and at the same time reduces cost to perform penetration testing. A hybrid pipeline based application scanning system is provided to perform security scanning of a web application. Referring now to the drawings, and more particularly to FIGS. 1 through 11, where similar reference characters denote corresponding features consistently throughout the figures, there are shown preferred embodiments.

FIG. 1 is a block diagram illustrates a hybrid pipeline based application scanning system 100 to perform security scanning of a web application according to an embodiment herein. The block diagram view includes a scan queue 101, one or more phase 102A-N, an analysis unit 103, a one or more tasks 104, a task assignment unit 105, a testing unit 106, result collection unit 107, a result I−1 phase 108, a result I+1 phase 109, and a result queue 110. The hybrid pipeline based approach involves one or more phase 102A-N to scan a web application. The scan queue 101 communicates a scan request and delivers final results into the result queue 110. The analyze unit 103 analyze the scan request to generate one or more tasks 105 based on a scan profile. The scan profile includes (i) an uniform resource locator associated with an application, (ii) one or more scan attack templates, (iii) one or more attack rules, and (iv) one or more automation scan results. The one or more possible tasks include (i) dependencies between the one or more possible tasks, and (ii) a cost and a reward values for performing the one or more possible tasks.

For example, in I-phase, analyze the scan request to generate one or more tasks 105 (e.g., Ti,1 . . . |Ti,2| . . . |Ti,j| . . . |Ti, s|). The task assignment unit 105 assigns one or more tasks 104 to the testing unit 106. The testing unit 106 further includes one or more human security testers 106A, and an automated tool 106B. The at least one task from one or more tasks 104 is executed by the human security testers 106A and the automated tool 106B to obtain executed results in one or more phase. For example, the one or more tasks Ti,1 . . . |Ti,2| . . . |Ti,j| . . . |Ti, s| is executed by the human security testers 106A and the automated tool 106B to obtain one or more tasks results in I−1 phase and i+1 phase which are Ri−1,1|Ri−1,2| . . . |Ri−1,j| . . . |Ri−1, K and Ri, 1|Ri, 2| . . . |Ri, j| . . . |Ri, S correspondingly.

In one embodiment, the hybrid pipelined based application scanning system 100 solves one or more challenges based on a semi-automated scanning approach. In one embodiment, once a phase is completed for a scan request, one or more resources which are allocated to the phase can be assigned to next scan request and as a result multiple scans can be executed by the hybrid pipelined based scanning system 100. For example, a collaborative approach is required for the human security testers 106A to be specifically trained in performing specific tasks and by allocating more and more human resources to each phase. In another aspect, the hybrid pipelined based application scanning system 100 captures the web application scanning process in form of a scan workflow template, dividing one or more process into various automated and manual tasks performed at during various phases. The scan workflow template is continuously improved based upon feedback from security community and one or more domain experts.

Figure 2:
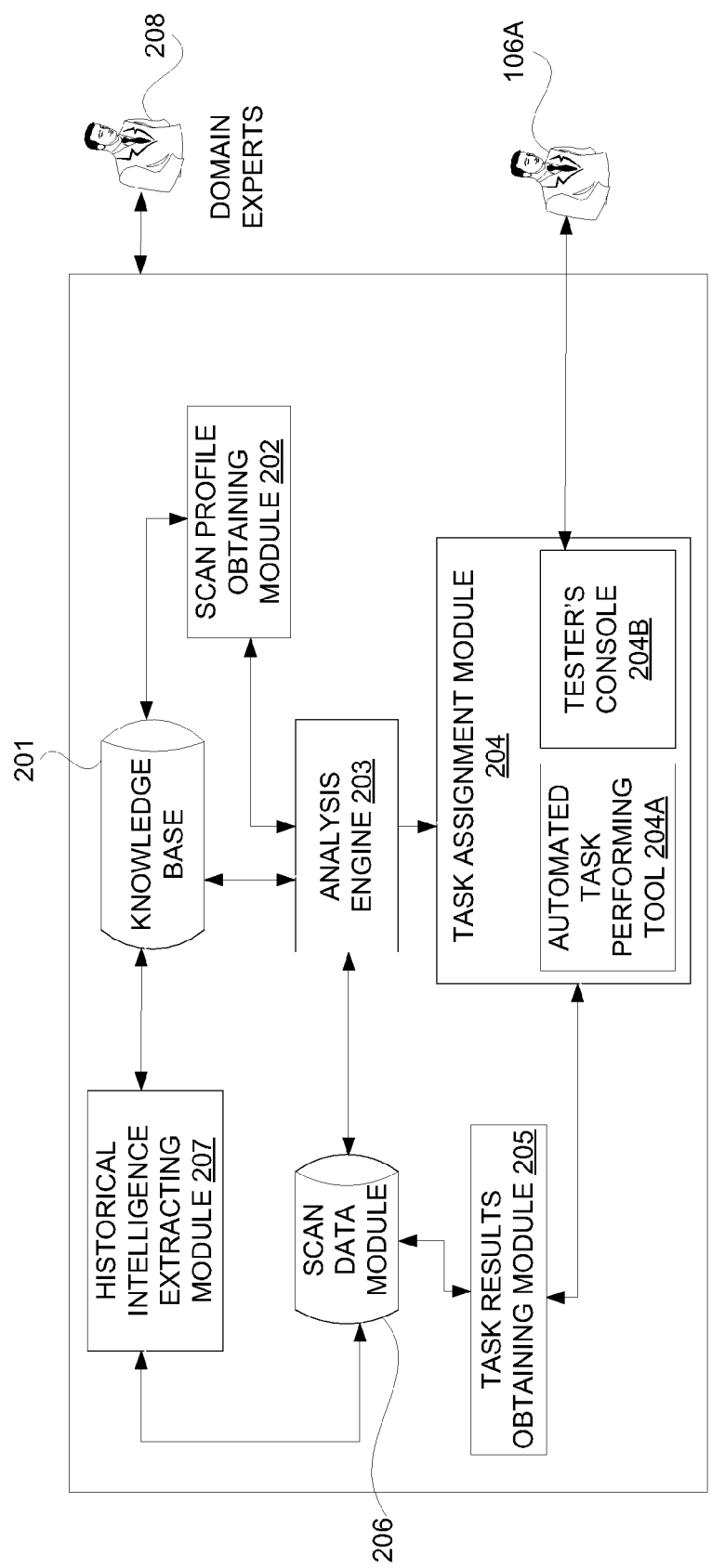
FIG. 2 illustrates a exploded view of the hybrid pipelined based scanning system according to an embodiment herein.

FIG. 2 illustrates an exploded view of the hybrid pipelined based application scanning system 100 according to an embodiment herein. The hybrid pipelined based application scanning system 100 includes a knowledge base 201, a scan profile obtaining module 202, a analysis engine 203, a task assignment module 204, a task result obtaining module 205, and scan data module 206, a historical intelligence extracting module 207, and domain experts 208. The knowledge base 201 includes knowledge in form of (i) scan workflow templates, and (ii) attack rules. The knowledge base 201 further includes sequential information of one or more steps taken during scan of the web application. The knowledge base 201 is regularly updated by the domain experts 208. In one embodiment, during one or more subsequent scans of the application the information stored from the previous scan may be used to automate the steps, which were manually performed during the previous scan.

The scan profile obtaining module 202 that obtains a scan profile as an input. The scan profile includes (i) an uniform resource locator associated with an application, (ii) one or more scan attack templates, (iii) one or more attack rules, and (iv) one or more automation scan results. The analysis engine 203 further includes (i) an task generation module, and (ii) a task selection module. The task generation module that generates a one or more possible tasks. The one or more possible tasks include (i) dependencies between the one or more possible tasks, and (ii) a cost and a reward values for performing the one or more possible tasks. The task selection module that selects at least a sub-set of tasks from the one or more possible tasks based on one or more parameters selected from a group comprising (i) task goals, and (ii) one or more use cases.

The task assignment module 204 that assigns the sub-set of tasks to an automated task performing tool 204A, and console associated with a user for execution based on an availability the user and the automated task performing tool, a complexity of a task, a level of skill of said user, time to finish constraints, and the cost and reward values. In one embodiment, the user is a human tester. The task result obtaining module 205 that (i) obtains one or more tasks results associated with the sub-set of tasks executed by the automated task performing tool, and the user, and (ii) update a database based on the one or more tasks results. The extract historical intelligence module 207 analyze historical web application scan data, extract relevant intelligence and update the one or more attack rules and scan workflow templates.

Figure 3:
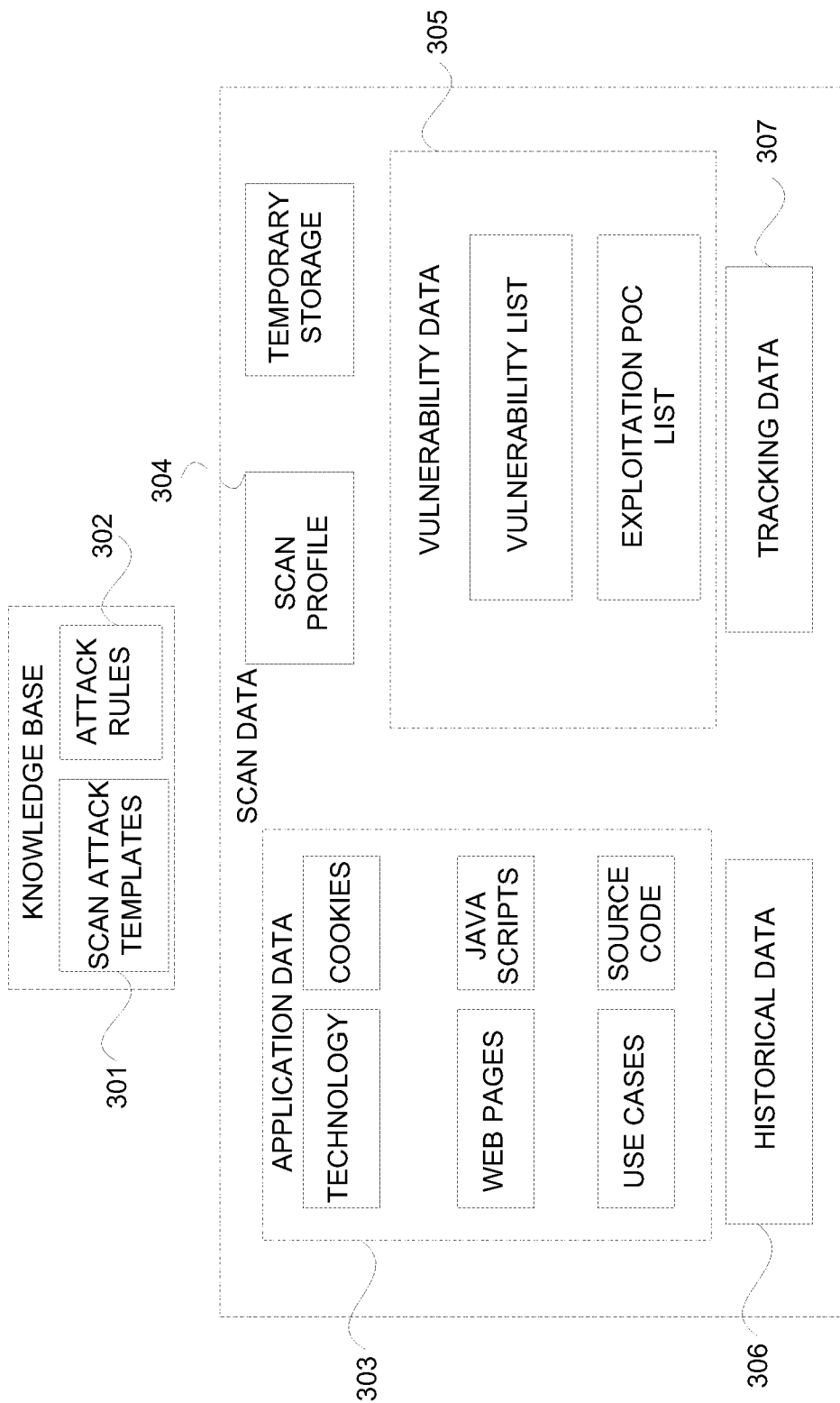
FIG. 3 is a block diagram illustrating the components of the knowledge base and scan data module according to an embodiment herein.

FIG. 3 is a block diagram illustrating the components of the knowledge base 201 and scan data module 206 according to an embodiment herein. The scan data module 206 provide storage space for current and historical data 306 related to web application scanning so that data can be created, read, modified, and deleted by any component of hybrid pipelined based application scanning system. The scan data module 206 stores application data 303 including technology implementation details, cookies, crawled web pages, use cases, and source code. The scan data module 206 may further stores scan profiles 304 of web applications based on the input provided by end customers. The scan data module 206 stores vulnerability data 305 including list of vulnerabilities detected and list of exploitation proof of concepts. The scan data module 206 also stores tracking data 307 includes information of one or more tasks and associated status, resource utilization and availability and scan request queues and status of each scan.

Figure 4:
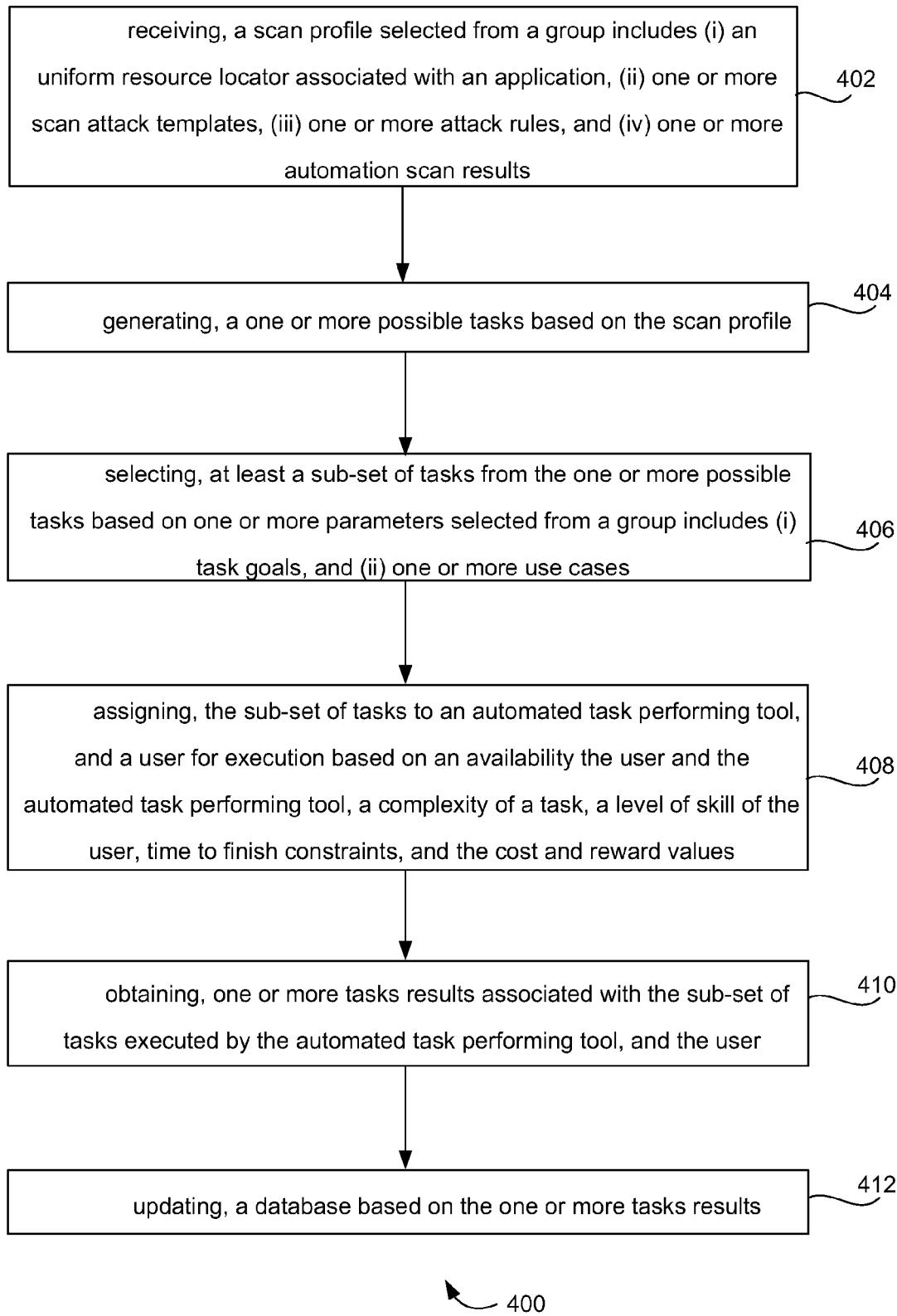
FIG. 4 is a flow diagram illustrating method of performing a security web application testing based on a hybrid pipelined application according to an embodiment herein.

FIG. 4 is a flow diagram illustrating method of performing a security web application testing based on a hybrid pipelined application according to an embodiment herein. In step 402, a scan profile is received which is selected from a group includes (i) an uniform resource locator associated with an application, (ii) one or more scan attack templates, (iii) one or more attack rules, and (iv) one or more automation scan results. In step 404, a one or more possible tasks is generated based on the scan profile. In step 406, at least a sub-set of tasks is selected from the one or more possible tasks based on one or more parameters selected from a group include (i) task goals, and (ii) one or more use cases. In step 408, the sub-set of tasks is assigned to an automated task performing tool, and a user for execution based on availability the user and the automated task performing tool, a complexity of a task, a level of skill of the user, time to finish constraints, and the cost and reward values. In step 410, one or more tasks results associated with the sub-set of tasks are obtained which are executed by the automated task performing tool, and the user. In step 412, a database is updated based on the one or more tasks results. The one or more possible tasks may include (i) dependencies between the one or more possible tasks, and (ii) a cost and a reward values for performing the one or more possible tasks. The method may further include one or more steps is recorded which are associated with an execution of the sub-set of tasks by the user.

The method may further include a correlation of one or more tasks results are performed with the one or more scan attack templates to generate a subsequent set of tasks. The method may further include the subsequent set of tasks is assigned to the user based on the one or more steps. The one or more possible tasks may be generated based on one or more models (i) attack rules, and (ii) a hybrid task graph (HTG). The hybrid task graph may be updated based on the one or more tasks results. The updated hybrid task graph may include (i) pruning of a sub-graph of the hybrid task graph, (ii) adding new task nodes, (iii) re-computing the one or more factors for each task node, or (iv) combinations thereof.

The method may further include (i) a subsequent set of tasks results is obtained which are associated with the subsequent set of tasks from the automated task performing tool, and the user, and (ii) an updated hybrid task graph is generated based on the subsequent set of tasks results. The updated HTG include (i) pruning of a sub-graph of HTG, (ii) adding new task nodes, (iii) re-computing the one or more factors for each task node, or (iv) combinations thereof.

Figure 5:
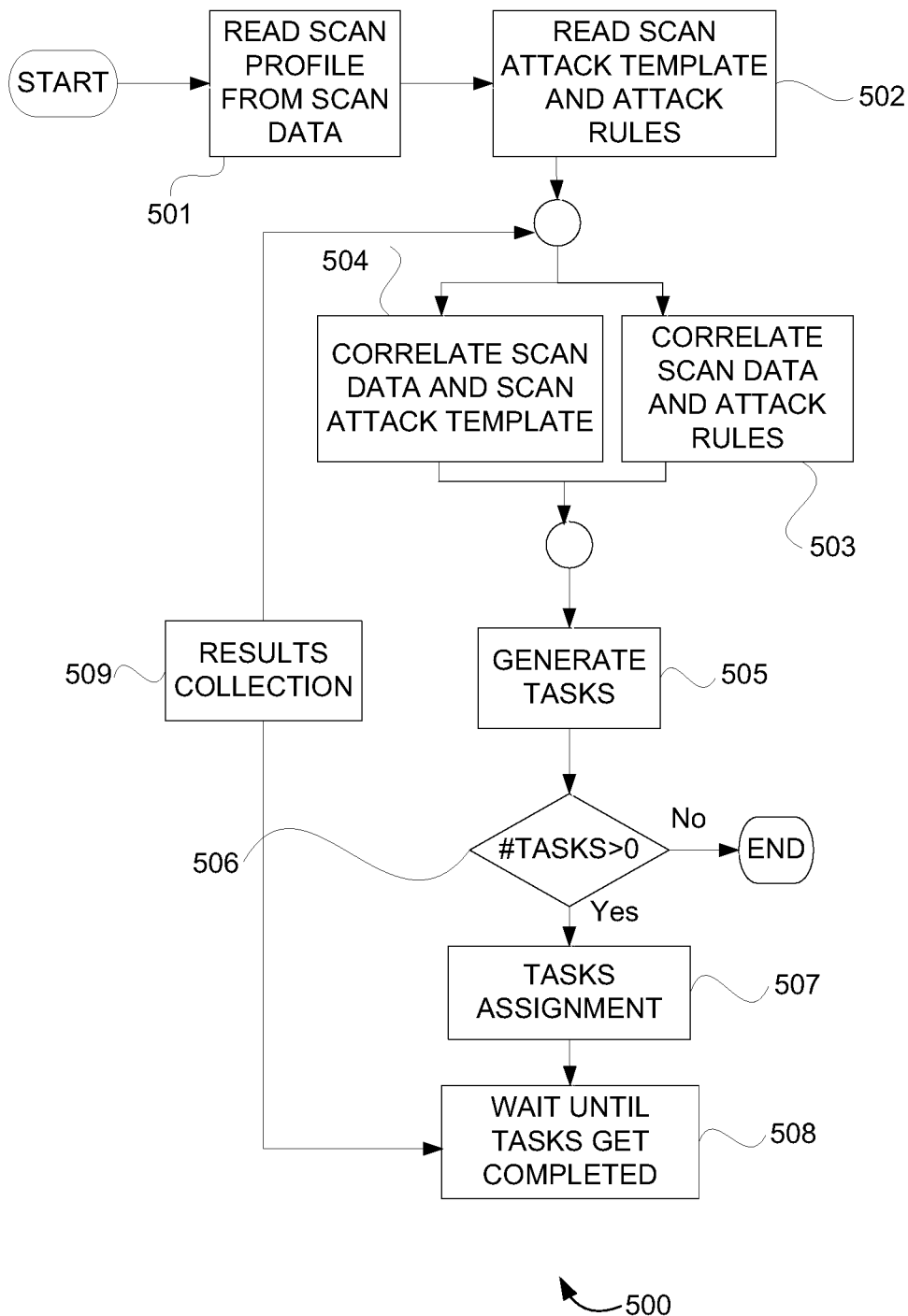
FIG. 5 is a flow diagram illustrating a method of iterative execution of task to complete a scan according to an embodiment herein.

FIG. 5 is a flow diagram 500 illustrating a method of iterative execution of task to complete a scan according to an embodiment herein. In step 501, a scan profile is inputted from the scan data module 206. In step 502, a scan attack template and attack rules are obtained. In step 503 and 504, one of the most important aspects of the analysis engine 203 component is to correlate real time scan data, perform pattern matching against the attack rules 302 and trigger tasks to improve the quality of scan results. A simple representation of an attack rule may be in an attack description language (ADL) is, when conditions are true then perform specified tasks. In accordance with one embodiment, the attack rules 302 are a collection of one or more rules during execution of web application scanning including detection of logical security vulnerabilities, elimination of false positives of vulnerabilities, task assignment to human testers and automation tools, capturing and utilizing historical intelligence, and optimizing scan execution. The analysis engine 203 may also assign tasks to human security testers based on the knowledge base 201. If the knowledge base includes the recorded steps of the previous scan, then those recorded steps could be automated in the subsequent scans of the web-application.

The attack rules 302 may be defined for any new attack, rule to eliminate false positives and any other kind of useful intelligence discovered by online security community and researchers, human testers, and domain experts. In the similar way, the attack rules 302 can be defined from historical analysis of scan data. The historical analysis of scan data provides valuable intelligence including real time decisions and actions taken by human security testers, application specific historical data including logical and false positives vulnerabilities discovered.

In one embodiment, the one or more tasks is generated based on various models includes (i) attack rule, (ii) a hybrid tasks graph (HTG). An example of one of the aspect of the hybrid tasks graph (HTG). The hybrid tasks graph may be a dynamic graph, where task nodes and edges are created, updated or deleted as the task nodes are processed by either an automated tool or a human security tester.

For example, if processing a task discovers new functional use case in the application, it may result into more number of business logic test cases to be performed, and as a result the hybrid tasks graph is added with corresponding task nodes. In another example, if processing a task of detecting backend database server results into a specific backend database, then deletes the task nodes corresponding to other types of databases. Similarly, a human tester with less skill set may reassign a task to another human tester with more skill set.

In another aspect, the hybrid tasks graph assigns cost and reward value to each task node. Cost of the task node is determined by time taken to complete the task and cost of assigned execution unit. For example, a higher expertise level human tester incurs more cost than a relatively lesser expertise level human tester. The reward value of a task node is determined using various heuristics, as the exact reward value may not be computable at that point of time. For example, consider a task node A. If A is executed, and it discovers new functional use cases in the application, then adds more task nodes to the hybrid tasks graph. As a result, reward of A is at least the sum of all of reward of newly discovered task nodes. All the leaf task nodes is either a constant or can be computed based on various parameters including severity of vulnerability.

Figure 6A:
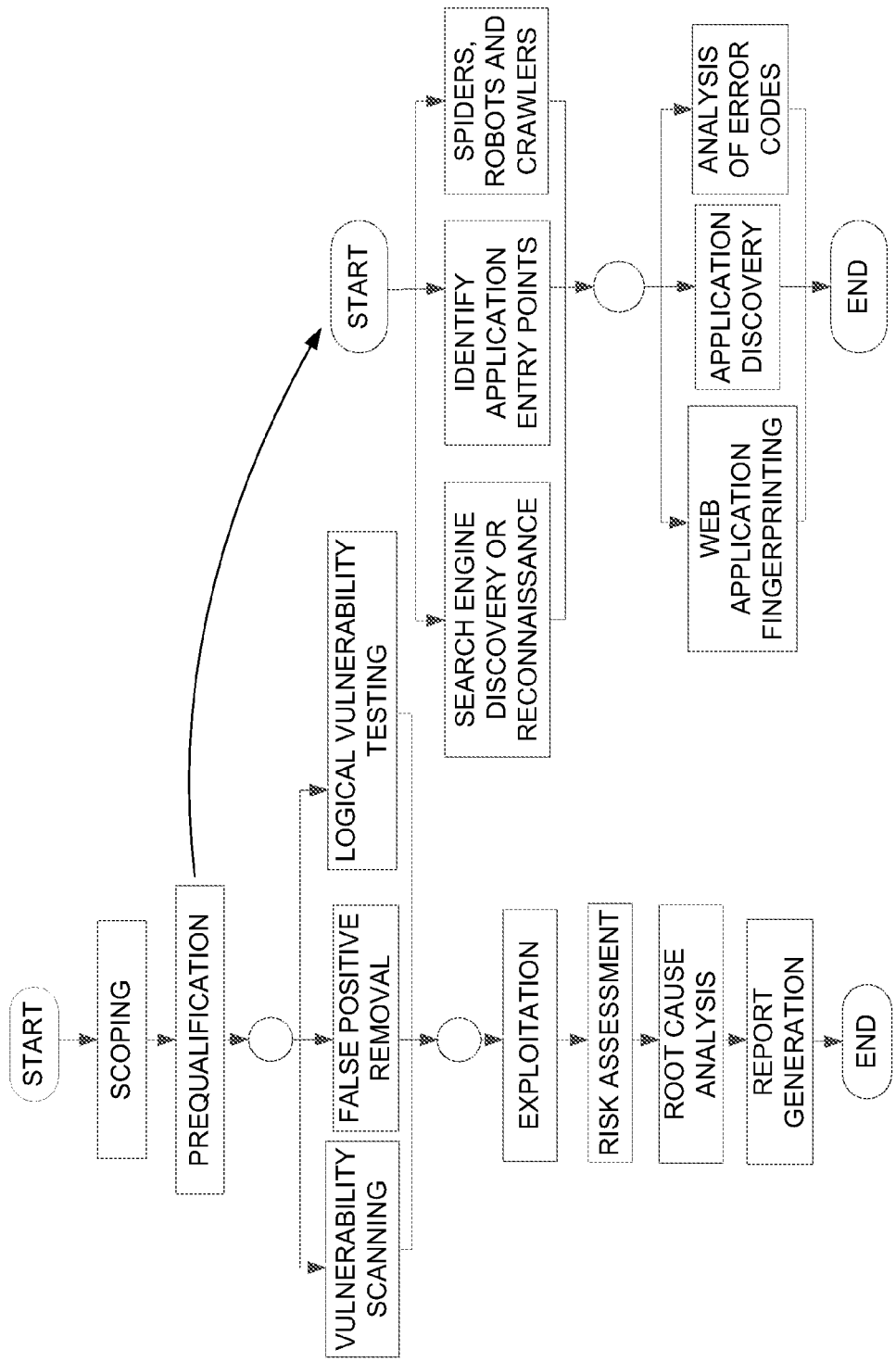
FIGS. 6A and 6B is a flow diagram illustrating the scan attack templates according to an embodiment herein.
Figure 6B:
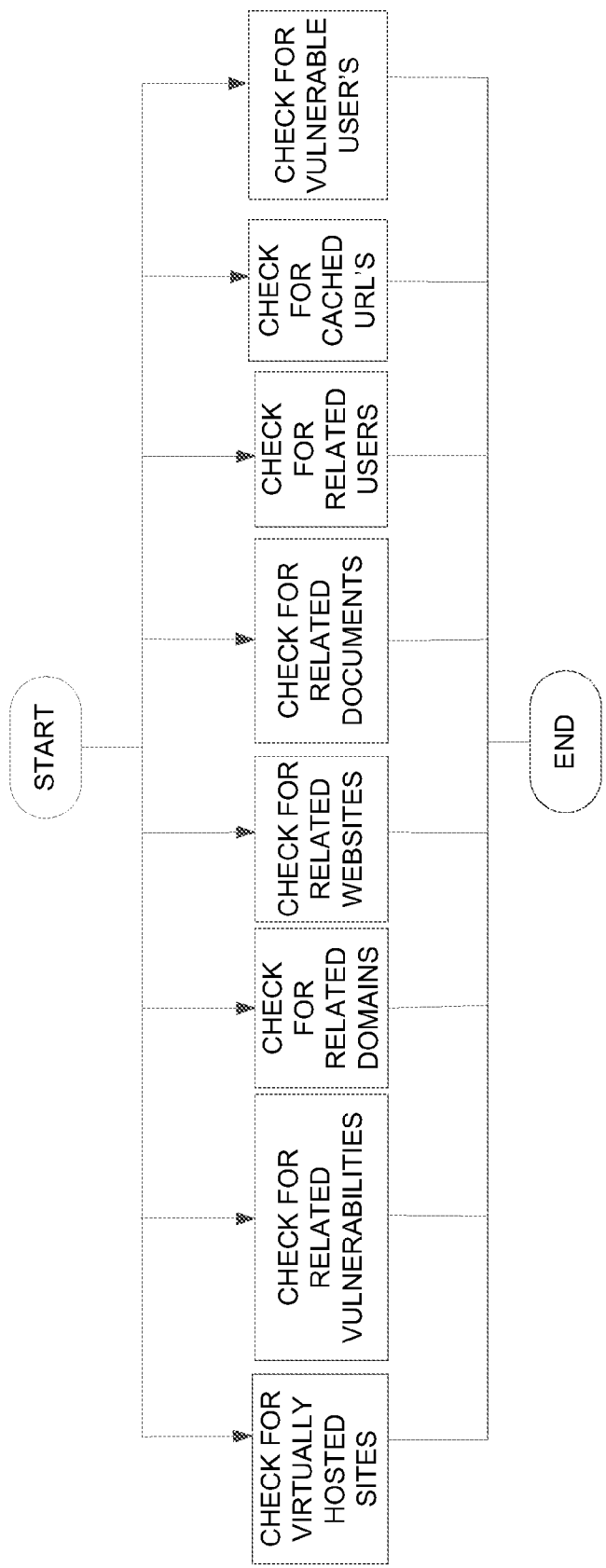

In another aspect of HTG, the main objective of method and system is to traverse the hybrid tasks graph to minimize total cost and maximize total reward, given a constraint on total time of execution and availability of execution units. For example, Input Parameters:
A: application URL
UT: upper bound on execution time of security testing
UC: upper bound on total cost of security testing
EV: <R1, R2, R3, R4 ... RN> vector of available execution units
CR: <CR1, Cr2, CR3 ... CRN>, cost of available execution units
AT: scan attack template & attack rules
Constraints:
T<=UT, execution time should be less than UT
C<=UC, total cost should be less than UC
Then,
G: Sum {Gi: reward of each leaf node}, Total reward FIGS. 6A and 6B is a flow diagram illustrating the sample scan attack template according to an embodiment herein. The scan attack template define flow of tasks need to be performed during application security testing. The scan attack template is used to generate hybrid task graph. There are two types of tasks in the scan attack template, which include (i) composite tasks and (ii) leaf tasks. The composite tasks are group of one or more of composite or leaf tasks performed as part of application security testing. As shown in FIG. 6A highlights the composite tasks and corresponding functions. For example, the composite tasks include scoping, prequalification, vulnerability scanning, false positive removal. The composite task e.g., prequalification, can be decomposed into more granular composite tasks, search engine discovery, identify application entry points.

FIG. 6B shows decomposition of composite task, search engine discovery for reconnaissance, into more granular composite or leaf tasks, in which check for virtually hosted sites, check of related vulnerabilities. Each task in the scan attack template provide details (e.g., summary, description, how to perform the task, skill set required to perform the task) can be performed by automated tool or human security testers, cost values, reward values etc.

Figure 7:
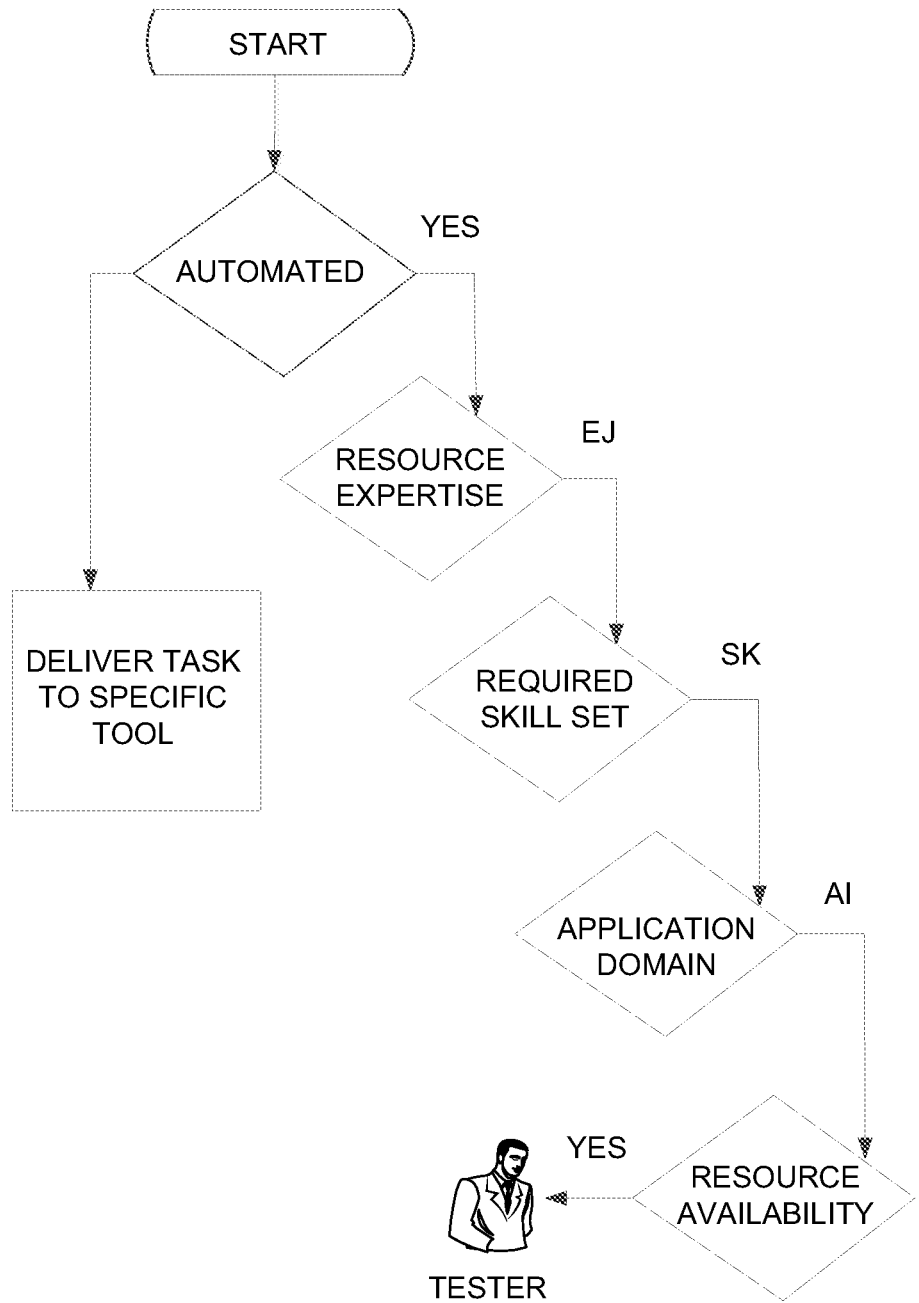
FIG. 7 is an exemplary view illustrating a task assignment decision performed by the tasks assignment module according to an embodiment herein.

FIG. 7 is an exemplary view illustrating a task assignment decision performed by the tasks assignment module 204 according to an embodiment herein. A task assignment is based upon multiple assignment rules including phase of scanning, experience, expertise level, skill set and availability of automated task performing tool and the user. Efficiency of the hybrid pipelined based application scanning system depends upon continuous generation and execution of tasks. If a task is halted because of either component failure or the user (e.g., human penetration tester) unavailability or human penetration tester being technically incapable to perform a task. As a result, accurate and continuous task assignment by the tasks assignment module 204 is extremely essential to increase efficiency.

Another component of the hybrid pipelined based application scanning system is to integrate human security testers and automated tools in a pipelined way so that manual and automated tasks are executed iteratively to perform web application scanning. The testers console 204B provides interface to assist human security testers to interact with hybrid pipelined based application. The testers console 204B presents tasks to the human security testers according to their role, availability and skill set. The human security testers may view the list of allocated tasks with the details including specification to perform the task, demos, tutorials and historical knowledge on the testers console 204B. The testers console 204B provides intuitive interface to collect task results. The testers console 204B also provides a mechanism to send alerts to human security testers via many different mediums including mobile phones.

Figure 8:
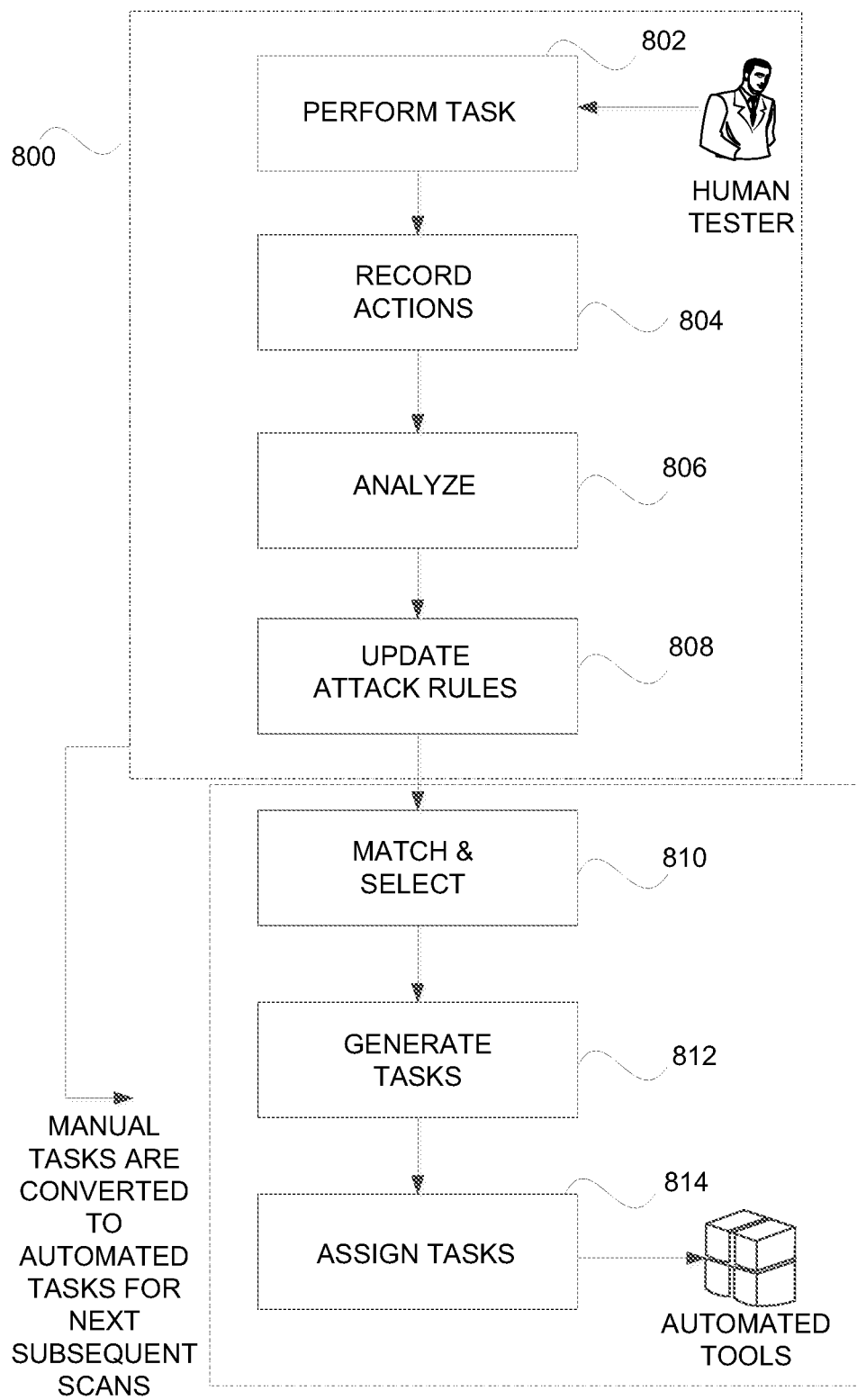
FIG. 8 is a flow diagram illustrating how manual tasks performed by human security testers gets recorded and performed automatically from the next subsequent scans according to an embodiment herein.

FIG. 8 is a flow diagram illustrating how manual tasks performed by human security testers gets recorded and performed automatically from the next subsequent scans according to an embodiment herein. In step 802, the human penetration tester performs a one or more tasks. The task is assigned to the human penetration tester by the Analysis engine 203. The analysis engine 203 records one or more steps performed associated with one or more tasks in step 804. In step 806, the steps are analyzed and in step 808 the attack rules are updated in the knowledge base 201. The manual tasks are converted to automated tasks for next subsequent scans. During a subsequent scan step 810 is performed to match and select appropriate attack rules from the knowledge base based upon various criteria. In step 812, one or more tasks results are generated for the automated tools. In step 814, the one or more tasks generated are assigned to the automated tools for execution.

FIGS. 9A, 9B and 9C is a user interface view illustrating method of performing a security web application testing based on a hybrid pipelined application according to an embodiment herein. The user interface view as shown in FIG. 9A highlights set of tasks that are pushed to one or more human testers. For example, the set of tasks are related to finding the business logic vulnerabilities in a web application. The user interface view includes a vulnerability field 901A, and a corresponding modules field 902A. Similarly, the user interface view as shown in FIG. 9B determines sample of the one or more tasks related to validating and remove false positives. For example, the human testers need to validate one or more vulnerabilities found by automated tools or scanners. The user interface view includes a vulnerability field 901B, a uniform resource locator field 902B, and severity of the corresponding vulnerabilities 903B. The severity of the one or more vulnerabilities is determined based on the uniform resource locator field which is associated with the one or more vulnerabilities. For example, the vulnerability "Windows hard link" and the corresponding severity is "Low".

Similarly, the user interface view as shown in FIG. 9C in which one or more tasks carried out by the human testers. A prequalification phase, as shown in scan attack templates involves one or more tasks related to various (i) information gathering activities e.g., crawling, finding functional use cases of the application, (ii) find constraints in the application that includes an account lockout, captcha, response time. The user interface view includes a identifier field 901C, a title field 902C, and status field 903C.

Figure 10:
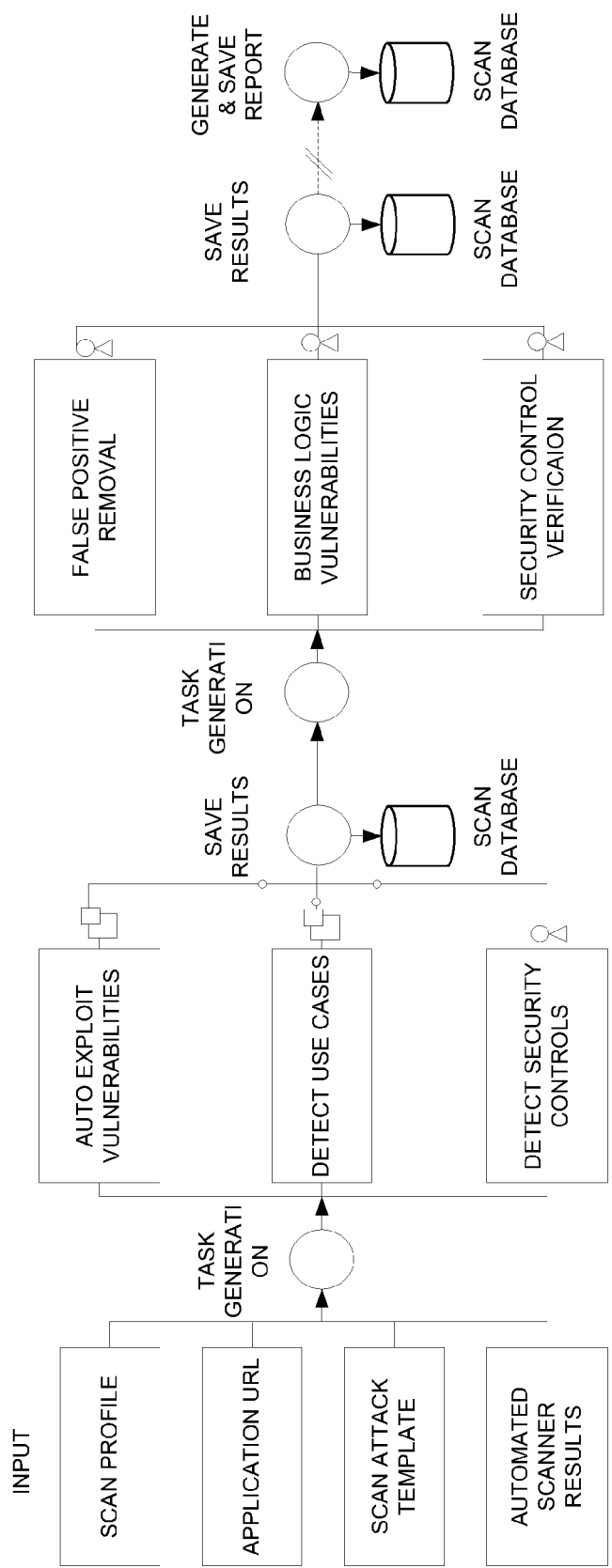
FIG. 10 is an exemplary view illustrating method of performing a security web application testing based on a hybrid pipelined application according to an embodiment herein.
Figure 11:
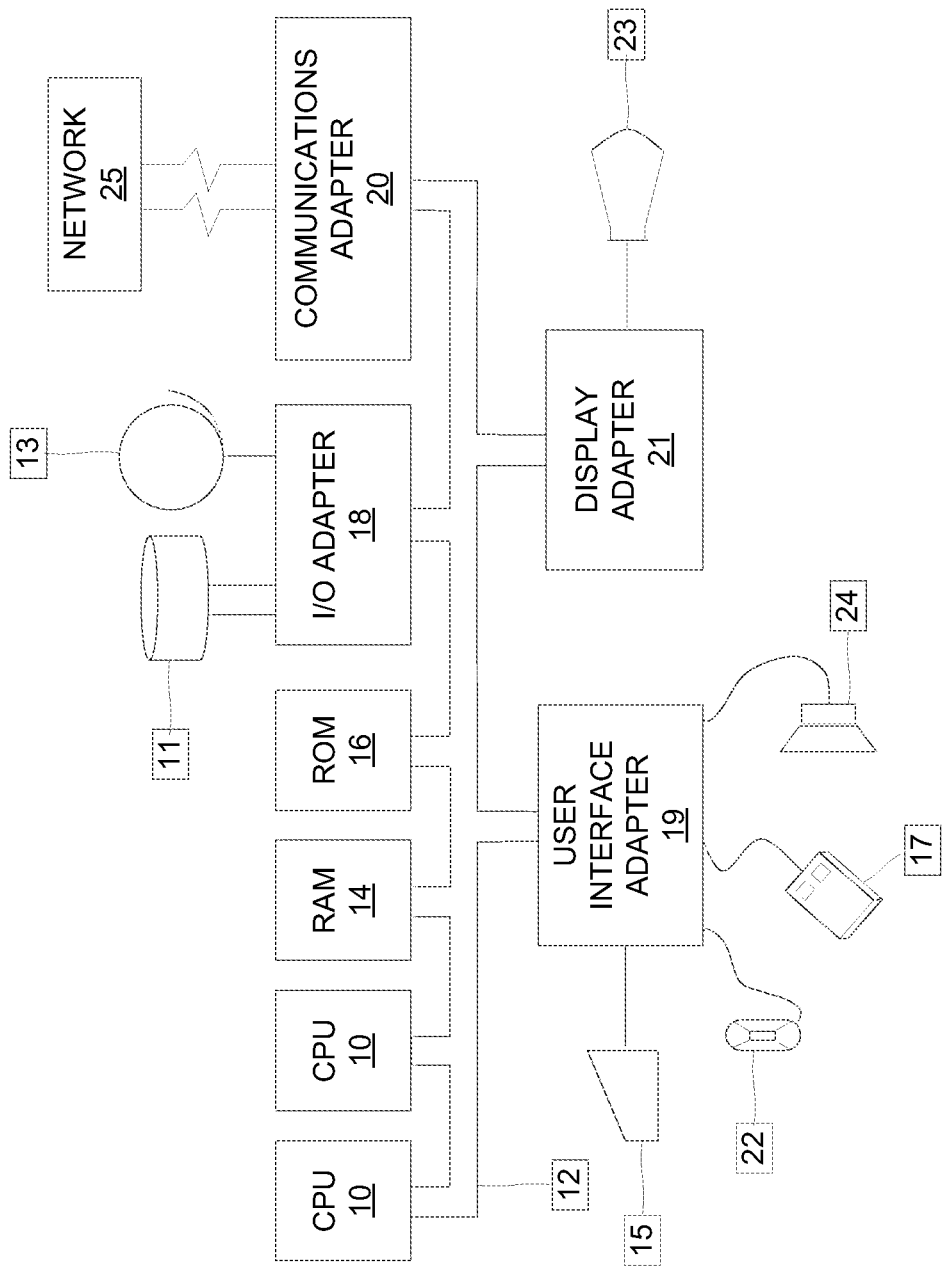
FIG. 11 illustrates a schematic diagram of computer architecture according to an embodiment herein.

FIG. 10 is an exemplary view illustrating method of performing a security web application testing based on a hybrid pipelined application according to an embodiment herein. The exemplary view includes the hybrid pipeline based application scanning system receives one or more input which includes scan profile includes (e.g., mode: Safe/Unsafe; Integrations: payment gateway; scan time limit: 300 hours, uniform resource locator (e.g., www.xyz.com), automated scanner results (e.g., SQL injection: www.xyz.com/1, cross site scripting: SQL injection: www.xyz.com/2, www.xyz.com/1). Based on the input, one or more tasks are generated. The generated one or more tasks are processed for auto exploit vulnerabilities (e.g., results are Pass: SQL Injection: www.xyz.com/1; Fail: Cross Site Scripting: SQL Injection: www.xyz.com/2, www.xyz.com/1), (ii) detect use cases (e.g., results are provide coupon code, shopping cart, payment via credit card, payment via cash on delivery) (iii) detect security controls (e.g., results are account lockout is possible, available captcha at 3 URL'S, CSRF prevention, SAML based single sign on). One or more tasks results are obtained and stored in a database.

A one or more subsequent tasks are generated based on the one or more tasks results. The one or more subsequent tasks are processed for (i) false positive removal (e.g., results are confirmed: SQL injection: www.xyz.com/1; false positive: cross site scripting: SQL injection: www.xyz.com/2, www.xyz.com/1), (ii) tasks of business logic vulnerabilities (e.g., check coupon validity bypass, check coupon redeem bypass, check for absence of mobile verification on cash on delivery, check for price manipulation). The one or more subsequent tasks results are stored and a report is generated.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 10. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

An individual human penetration tester need not think about the overall process and what to do next. A continuous improvement ensures that new attacks and threats are always covered irrespective of experience of any individual human penetration tester. The application penetration testing tasks are pushed or assigned to execution units based on a certain workflow. The method or system maintains the cost, quality, consistency, and time constraints. The execution units just need to complete their assigned tasks. The hybrid pipelined based scanning system 100 allocates every task automatically to either a human penetration tester or an automated tool, collects results once the task is completed. As a result, coordination overhead among multiple human security testers and automated tools becomes negligible leading to better efficiency and scalability. The hybrid pipelined based scanning system 100 presents a task in a most intuitive manner to human security testers providing all necessary knowledge related to the task including demos, tutorials, and historical information.

The advantage of this approach is that human security testers need not think of what and how tasks are to be performed and they can focus on their tasks currently allocated. The task planning is automatically done which leaves the human security testers with ample time to focus on the current task on hand. Task generation and allocation is automated and as a result the efficiency of human security testers increases substantially. The hybrid task graph may be continuously improved based upon the feedback and as a result the quality of results also gets continuously improved. The advantage of this approach is that once any kind knowledge, including new kind of attacks and decisions made by a human tester, discovered during an application scan can be utilized over and over again in future multiple scans.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor implemented method of performing a security web application testing based on a hybrid pipelined application, said processor implemented method comprising:
   (a) receiving, a scan profile selected from a group comprising of (i) an uniform resource locator associated with an application, (ii) one or more scan attack templates, (iii) one or more attack rules, and (iv) one or more automation scan results;
   (b) generating, a one or more possible tasks based on said scan profile, wherein said one or more possible tasks comprises (i) dependencies between said one or more possible tasks, and (ii) a cost and a reward values for performing said one or more possible tasks;
   (c) selecting, at least a sub-set of tasks from said one or more possible tasks based on one or more parameters selected from a group comprising (i) task goals, and (ii) one or more use cases;
   (d) assigning, said sub-set of tasks to an automated task performing tool, and a user for execution based on an availability said user and said automated task performing tool, a complexity of a task, a level of skill of said user, time to finish constraints, and said cost and reward values;
   (e) obtaining, one or more tasks results associated with said sub-set of tasks executed by said automated task performing tool, and said user; and
   (f) updating, a database based on said one or more tasks results.

2. The processor implemented method of claim 1, further comprising, recording one or more steps associated with an execution of said sub-set of tasks by said user.

3. The processor implemented method of claim 2, further comprising, performing a correlation of one or more tasks results with said one or more scan attack templates to generate a subsequent set of tasks.

4. The processor implemented method of claim 3, further comprising, assigning said subsequent set of tasks to said user based on said one or more steps.

5. The processor implemented method of claim 1, wherein said one or more possible tasks is generated based on one or more models (i) attack rules, and (ii) a hybrid task graph (HTG).

6. The processor implemented method of claim 1, wherein said hybrid task graph is updated based on said one or more tasks results, wherein said updated hybrid task graph comprises (i) pruning of a sub-graph of said hybrid task graph, (ii) adding new task nodes, (iii) re-computing said one or more factors for each task node, or (iv) combinations thereof.

7. The processor implemented method of claim 1, further comprising,
   (i) obtaining a subsequent set of tasks results associated with said subsequent set of tasks from said automated task performing tool, and said user; and
   (ii) generating an updated hybrid task graph based on said subsequent set of tasks results, wherein said updated hybrid task graph comprises (i) pruning of a sub-graph of said hybrid task graph, (ii) adding new task nodes, (iii) re-computing said one or more factors for each task node, or (iv) combinations thereof.

8. A computer implemented system for performing a secure testing of target web application based on a hybrid pipelined application, said computer implemented system comprising:
   (i) a memory unit that stores (a) a set of modules, (b) a database, and instructions, wherein said database comprises (i) information associated with a scan profile, and (ii) one or more tasks results, and (c) a knowledge base, wherein said knowledge base comprises knowledge in form of (i) scan workflow templates, and (ii) one or more rules, wherein said knowledge base further comprises sequential information of one or more steps taken during a first scan of said web application; and
   (ii) a processor when configured by said instructions executes said set of modules, wherein said set of modules comprises:
      (a) a scan profile obtaining module, executed by said processor, that obtains a scan profile as an input, wherein said scan profile comprises (i) an uniform resource locator associated with an application, (ii) one or more scan attack templates, (iii) one or more attack rules, and (iv) one or more automation scan results;
      (b) an analysis engine, executed by said processor, that further comprising:
         (i) an task generation module, executed by said processor, that generates a one or more possible tasks based on said scan profile, wherein said one or more possible tasks comprises (i) dependencies between said one or more possible tasks, and (ii) a cost and a reward values for performing said one or more possible tasks;
         (ii) a task selection module, executed by said processor, that selects at least a sub-set of tasks from said one or more possible tasks based on one or more parameters selected from a group comprising (i) task goals, and (ii) one or more use cases;
      (c) a task assignment module, executed by said processor, that assigns said sub-set of tasks to an automated task performing tool, and a user for execution based on an availability said user and said automated task performing tool, a complexity of a task, a level of skill of said user, time to finish constraints, and said cost and reward values; and
      (d) a tasks results obtaining module, executed by said processor, that (i) obtains one or more tasks results associated with said sub-set of tasks executed by said automated task performing tool, and said user, and (ii) update a database based on said one or more tasks results.

9. The computer implemented system of claim 8, further comprising, a task recording module, executed by said processor, that records one or more steps associated with an execution of said sub-set of tasks by said user.

10. The computer implemented system of claim 9, further comprising, a correlation of one or more tasks results is performed with said one or more scan attack templates to generate a subsequent set of tasks.

11. The computer implemented system of claim 10, further comprising, assigned said subsequent set of tasks to said user based on said one or more steps.

12. The computer implemented system of claim 8, wherein said one or more possible tasks is generated based on one or more models (i) attack rules, and (ii) a hybrid task graph (HTG).

13. The computer implemented system of claim 8, wherein said hybrid task graph is updated based on said one or more tasks results, wherein said updated hybrid task graph comprises (i) pruning of a sub-graph of said hybrid task graph, (ii) adding new task nodes, (iii) re-computing said one or more factors for each task node, or (iv) combinations thereof.

14. The computer implemented system of claim 8, further comprising, (i) obtains a subsequent set of tasks results associated with said subsequent set of tasks from said automated task performing tool, and said user, and (ii) generates an updated hybrid task graph based on said subsequent set of tasks results, wherein said updated hybrid task graph comprises (i) pruning of a sub-graph of said hybrid task graph, (ii) adding new task nodes, (iii) re-computing said one or more factors for each task node, or (iv) combinations thereof.

15. One or more non-transitory computer readable storage mediums storing one or more sequences of instructions, which when executed by one or more processors, causes
   (a) receiving, a scan profile selected from a group comprising of (i) an uniform resource locator associated with an application, (ii) one or more scan attack templates, (iii) one or more attack rules, and (iv) one or more automation scan results;
   (b) generating a one or more possible tasks based on said scan profile, wherein said one or more possible tasks comprises (i) dependencies between said one or more possible tasks, and (ii) a cost and a reward values for performing said one or more possible tasks;
   (c) selecting at least a sub-set of tasks from said one or more possible tasks based on one or more parameters selected from a group comprising (i) task goals, and (ii) one or more use cases;
   (d) assigning said sub-set of tasks to an automated task performing tool, and a user for execution based on an availability said user and said automated task performing tool, a complexity of a task, a level of skill of said user, time to finish constraints, and said cost and reward values;
   (e) obtaining one or more tasks results associated with said sub-set of tasks executed by said automated task performing tool, and said user; and
   (f) updating a database based on said one or more tasks results.

16. The one or more non-transitory computer readable storage mediums of claim 15, further comprising, recording one or more steps associated with an execution of said sub-set of tasks by said user.

17. The one or more non-transitory computer readable storage mediums of claim 16, further comprising, performing a correlation of one or more tasks results with said one or more scan attack templates to generate a subsequent set of tasks.

18. The one or more non-transitory computer readable storage mediums of claim 17, further comprising assigning said subsequent set of tasks to said user based on said one or more steps.

19. The one or more non-transitory computer readable storage mediums of claim 15, wherein a hybrid task graph is updated based on said one or more tasks results, wherein said updated hybrid task graph comprises (i) pruning of a sub-graph of said hybrid task graph, (ii) adding new task nodes, (iii) re-computing said one or more factors for each task node, or (iv) combinations thereof.

20. The one or more non-transitory computer readable storage mediums of claim 15, further comprising, (i) obtaining a subsequent set of tasks results associated with said subsequent set of tasks from said automated task performing tool, and said user; and (ii) generating an updated hybrid task graph based on said subsequent set of tasks results, wherein said updated hybrid task graph comprises (i) pruning of a sub-graph of said hybrid task graph, (ii) adding new task nodes, (iii) re-computing said one or more factors for each task node, or (iv) combinations thereof.

* * * * *